Oct. 20, 1936. W. I. JONES 2,058,319
METHOD OF ATTACHING WALLBOARD STRUCTURE TO A SUPPORT
Filed Nov. 27, 1933
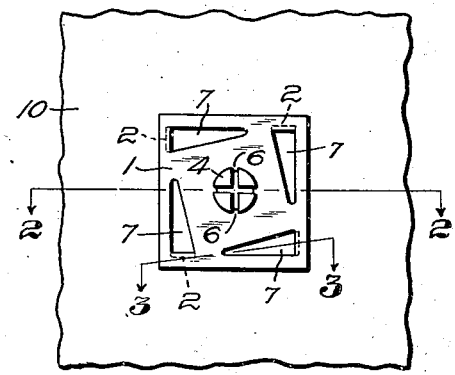
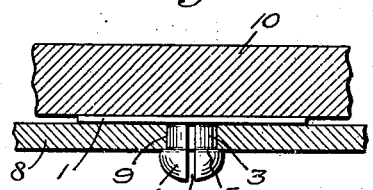
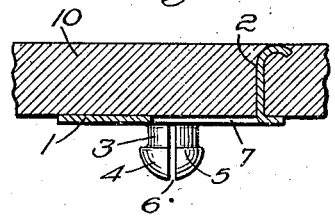
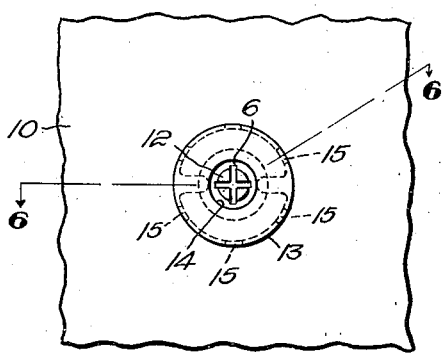
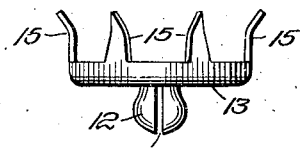
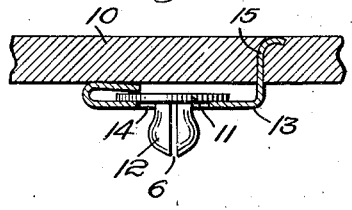
Inventor:
Walter I. Jones Patented Oct. 20, 1936

2,058,319

UNITED STATES PATENT OFFICE 2,058,319

METHOD OF ATTACHING WALLBOARD STRUCTURE TO A SUPPORT

Walter I. Jones, Arlington, Mass., assignor to United-Carr Fastener Corporation, Cambridge, Mass., a corporation of Massachusetts Application November 27, 1933, Serial No. 699,913

2 Claims. (Cl. 72—118)

My invention aims to provide improvements in the method of attaching wallboard and the like to a supporting structure.

In the drawing which illustrates preferred embodiments of my invention:—

Figure 1 is a bottom view of a portion of a piece of wallboard and the like showing one of my improved fastener elements as it would appear without the supporting structure;

Fig. 2 is an enlarged section taken on the line 2—2 of Fig. 1, the supporting structure being shown in cross-section;

Fig. 3 is an enlarged section taken on the line 3—3 of Fig. 1;

Fig. 4 is a view similar to Fig. 1, but showing a shiftable type fastener;

Fig. 5 is a side elevation of the fastener shown in Fig. 4 before attachment; and Fig. 6 is an enlarged section taken on the line 6—6 of Fig. 4.

Referring to the embodiment of my invention illustrated by Figures 1 through 3, I have shown a fastener secured installation particularly, though not exclusively, adapted to be used in connection with building structures. One of the uses for which my improved fastener and installation are particularly adapted is in connection with the attachment of wallboard to the frame structure of a steel house.

The first form of fastener illustrated by the annexed drawing is formed from a single piece of metal and has a base portion 1, a plurality of attaching prongs 2 extending at right angles from the periphery of the base portion 1 and a shank 3 extending from the center of the base portion. The shank 3 is pressed from the center of the base 1 and has a head 4 and an abrupt shoulder 5. The shank 3 is divided longitudinally by slits 6 to permit the head to contract and expand. The prongs 2 are located inwardly from the edge of the base and formed from material of the base, as best shown in Fig. 1. In order to keep the base as strong as possible, especially where the base and shank join, each prong is taken from material lying immediately between where it extends from the base and one of the next nearest prongs. Thus a substantial portion of the base 1 between the slits 6 and the apertures 7 remains imperforate, thereby preventing splitting of the base.

The parts to be secured together by my improved fastener include (Fig. 2) a supporting structure member 8 having an aperture 9 formed therethrough and a covering member 10 which may be any one of a number of common types of fibrous wallboard now being used in the building trades.

The elements of my improved installation above described may be easily and quickly assembled in the following manner. First, the fastener is attached to the apertured supporting structure 8 by entering the head 4 of the shank 3 through the aperture 9 so that the abrupt shoulder 5 engages the other side and locks therewith against axial pull, as shown in Fig. 2. It will be understood by those skilled in the art that this is a simple and efficient manner of attaching snap fasteners to a structure and any number of fasteners may be so attached prior to attachment of the wallboard 10. After the fastener members are properly located, an entire sheet of covering 10 may be easily and quickly attached by driving the wallboard against the projecting prongs 2, as shown in Fig. 4. During the attaching operation the prongs 2 pass through the wallboard 10 and when they reach the exposed surface are curled back into the material of the wallboard preferably as shown in Fig. 3. During the wallboard attaching operation a mallet or other suitable implement may be used which is so constructed that when the sharp pointed ends of the prongs 2 contact with it they will be curled back into the wallboard material. If desirable, an implement, such as a plate, providing an anvil may be placed against the outer face of the wallboard over a concealed fastener and the operator may strike the anvil plate one or more blows, thereby driving the prongs into the wallboard and curling them over by having them strike against the anvil plate during the pounding operation. This method of attaching the members firmly together is a simple and inexpensive one and furthermore is particularly desirable because it is unnecessary to use any aligning operation so far as the fastener members are concerned. Since the fasteners are put in place prior to attachment of the wallboard, that operation is a simple one and, since the prongs 2 may enter the wallboard at any point, it is only necessary to place the wallboard in the proper position and drive it into position.

The fastener shown in Figs. 4, 5 and 6 differs from that shown and described in connection with Figs. 1, 2 and 3 because it is constructed to permit shifting of the part secured to the frame structure relative to the part secured to the wallboard. The particular fastener illustrated has a stud member provided with a base 11 (Fig. 6) from which extends a yieldable stud portion 12 through an aperture in a casing part 13. The aperture 14 in the casing part is larger in diameter than the neck of the stud and, since the base 11 is smaller in diameter than the peripheral wall of the casing 13, limited lateral shifting of the stud member relative to the casing is permitted. A plurality of attaching prongs 15 extend from the peripheral wall of the casing 13 and have their outer ends normally bent slightly outwardly (Fig. 5) so that when they enter the wallboard 10 and come in contact with the anvil plate they will be bent outwardly and downwardly into the material of the wallboard, as illustrated. The attaching prongs 2 of the fastener previously described may also have their ends bent outwardly to insure return of the ends of the prongs into the material of the wall as desired.

The assembly of the elements of a structure including a fastener like that shown in Figs. 4, 5 and 6 is the same as described in connection with the structure shown in Figs. 1, 2 and 3. By using a shiftable fastener, however, any tendency of temperature variations to have one part of the installation move relative to the other will not buckle or warp one part of the structure relative to the other because of the fact that the fastener elements may move laterally, thereby compensating for any tendency for lateral movement of one part of the structure relative to the other.

The installations described are particularly useful in connection with securing wallboard to steel frame houses and the like because there is a finished appearance when the wallboard is in place because of the fact that the attaching prongs are not exposed to any appreciable extent. Furthermore, the fastening members are of the snap type so that they may be easily and quickly snapped into place on the frame structure without the necessity of using a tool to do so. The snap fasteners may be positively interlocked with the frame structure so that they cannot be removed without distorting them, or they may be so constructed that they may be moved without harm by a straight axial pull.

While I have illustrated and described preferred embodiments of my invention I do not wish to be limited thereto, because the scope thereof is best defined by the annexed claims.

I claim:

1. The method of attaching wallboard and the like to a supporting structure by snap fastening members having attaching prongs extending in one direction and a stud portion extending in the opposite direction, which comprises providing the supporting structure with stud-receiving means, snapping the stud portion of the snap fastener into engagement with the stud-receiving means presented by the supporting structure in a manner so that the attaching prongs are exposed and then forcing the wallboard against the attaching prongs to secure the wallboard in position.

2. The method of attaching wallboard and the like to a supporting structure by snap fastening members having attaching prongs extending in one direction and a stud portion extending in the opposite direction, which comprises providing the supporting structure with stud-receiving means, snapping the stud portion of the snap fastener into engagement with the stud-receiving means presented by the supporting structure in a manner so that the attaching prongs are exposed and then forcing the wallboard against the previously bent ends of the attaching prongs whereby the prongs are forced through the wallboard and the curved ends are returned into the wallboard material after striking a suitable anvil held against the outer face of the wallboard during the attaching operation.

WALTER I. JONES.